Oct. 27, 1970     W. A. DENEHIE     3,535,765
VALVE SEAT EXTRACTOR
Filed Nov. 29, 1967     2 Sheets-Sheet 1
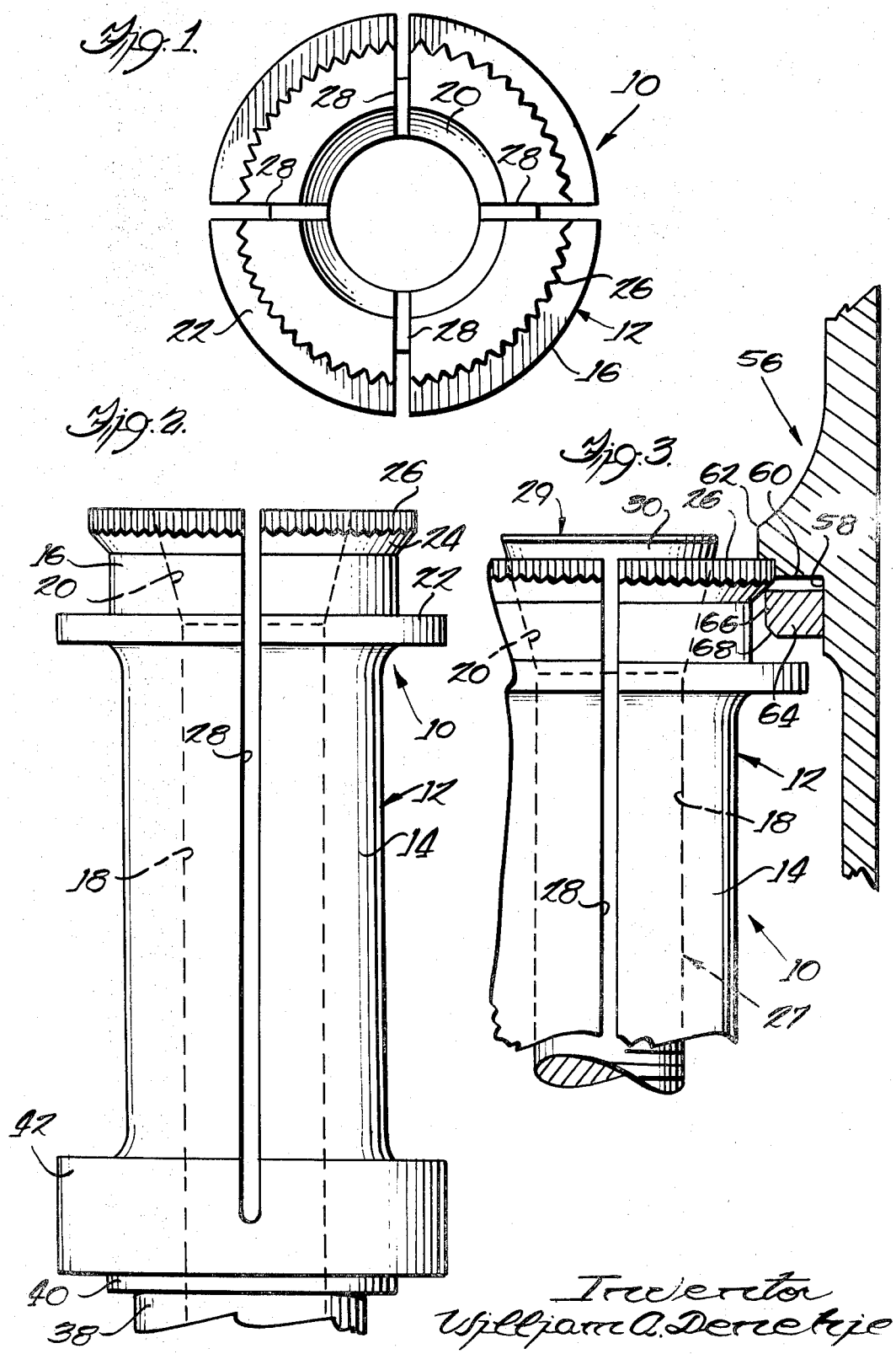
Inventor
William A. Denehie
by: Olson, Trexler, Wolters, & Bushnell
Atty's

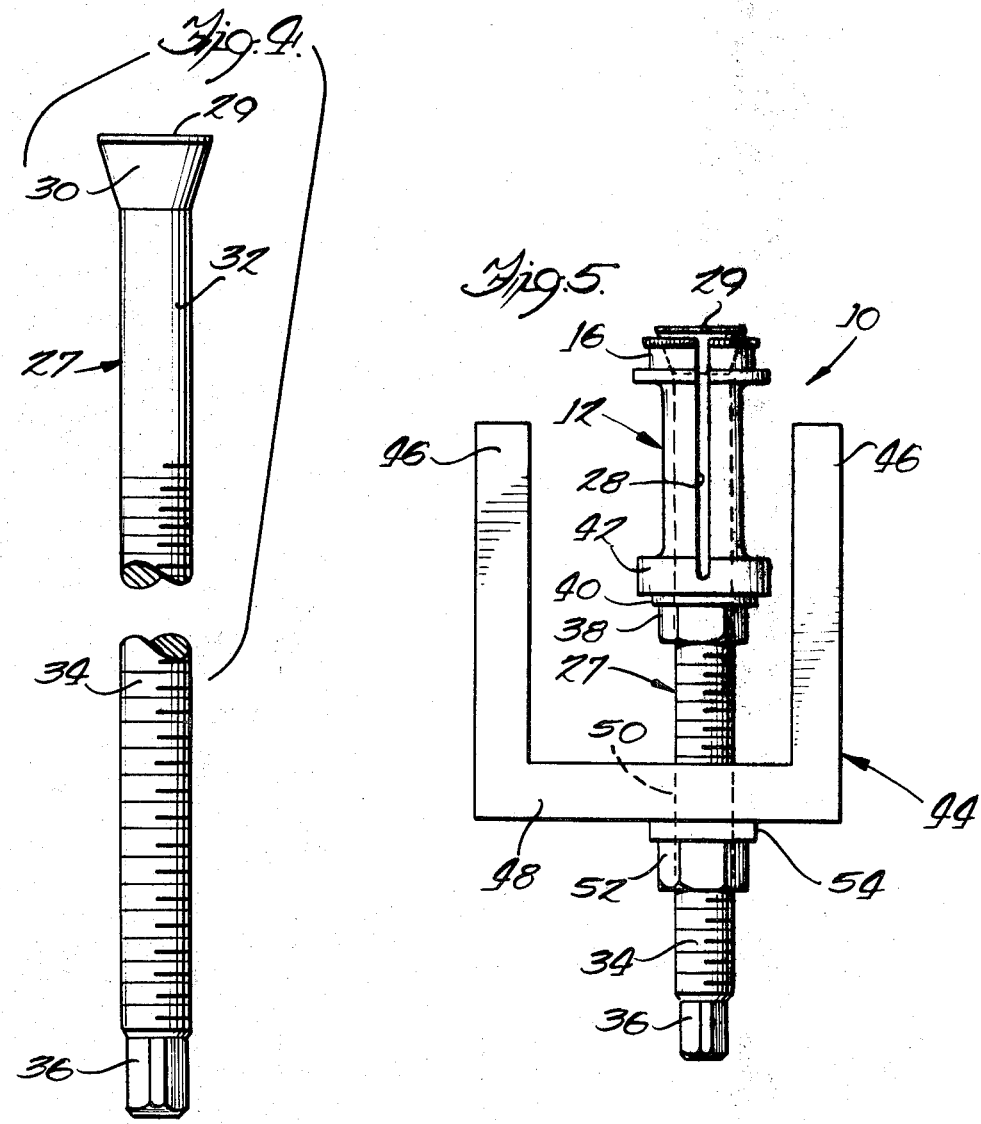

# United States Patent Office

3,535,765
Patented Oct. 27, 1970

3,535,765
VALVE SEAT EXTRACTOR
William A. Denehie, P.O. Box 261,
De Kalb, Ill. 60115
Filed Nov. 29, 1967, Ser. No. 686,525
Int. Cl. B23p *19/02*
U.S. Cl. 29—427                6 Claims

ABSTRACT OF THE DISCLOSURE

A hardened steel tool with a serrated periphery for biting into the cast iron of an internal combustion engine below a hardened steel valve seat insert to effect underlying engagement of the insert for removal thereof.

---

It is common practice in present day automobile and other internal combustion engines to provide hardened steel inserts for valve seats. Although the hardened steel seats have a much longer service life than the old fashioned seats formed simply in the cast iron block, they may on occasion require replacement before the engine has reached the end of its normal service life. Build-up of carbon deposits on the valve seat or on the valve itself may cause local heating and local hammering of the valve seat, and this may in turn cause breaking off of pieces of the seat, bearing in mind that the hardened valve seat inserts are somewhat brittle. The inserts may deform somewhat under severe conditions of heating, and other factors may require replacement.

Such valve seat inserts are mounted quite tightly in counterbores in the engine, which counterbores are in the head of an overhead valve engine, the most popular type at present. The internal diameter of the underlying opening in the head typically is no larger than the internal diameter of the valve seat insert, and may actually be somewhat smaller. Considering this disparity in diameter, and the fact that the insert sits tight against the underlying surface, there simply is no way to engage beneath the valve seat insert to remove it. Conventional practice is to place the end of a cold chisel against the insert, and to rap the chisel with a heavy hammer. Hopefully, the valve seat insert fractures, and then may be removed in pieces. Unfortunately, this often results in indenting and damaging an adjacent part of the engine. Such damage may prevent proper seating or sealing of a replacement insert, but this does not trouble most mechanics who simply go ahead and install a new insert, even though the installation may be faulty and lead to early failure of the replacement seat or an accompanying valve. Furthermore, in fracturing a valve seat insert, there is always the danger of pieces thereof flying around to injure the mechanic or a bystander. Also, it can happen that one of the broken pieces will lodge in a part of the engine so as to cause damage to the engine at a subsequent time.

Accordingly, it is an object of the present invention to provide an improved valve seat insert removal tool.

It is further an object of the present invention to provide a valve seat extractor for internal combustion engines which does not require fracturing of the valve seat insert with the dangers inherently attendant thereupon.

Specifically, it is an object of the present invention to provide a valve seat extractor having a hardened serrated edge for biting into the cast iron of the engine underlying the valve seat insert for removal of the insert.

Other and further objects and advantages of the present invention will be apparent from the following description wherein:

FIG. 1 comprises an end view of the collet portion of my valve seat extractor;

FIG. 2 comprises a fragmentary side view thereof;

FIG. 3 comprises a fragmentary side view of the extractor in cooperation with a valve seat insert for the removal of said valve seat insert;

FIG. 4 is a side view of the extractor screw; and

FIG. 5 is a side view on a reduced scale of the complete extractor tool.

Referring now in greater particularity to the drawings, the extractor, generally designated by the numeral 10, includes a collet portion 12 having a shank 14 with a head 16 at the end thereof. The shank 14 is provided with a central bore 18 flaring out at a 30-degree angle at 20 within the head. A circumferential flange 22 encircles the collet at the base of the head, and limits insertion of the extractor in an engine.

The collet head, at its extreme entering end, flares outwardly at 45° as indicated at 24 to form a head flange having circumferential serrations or teeth 26. The collet head, and particularly the serrations thereof, are formed of a hardened steel which is substantially harder than the cast iron of an automobile engine. The head 16 and adjacent portion of the shank 14 are provided with longitudinal slots 28 to permit radial flexibility of the collet shank and head. Four such slots are shown, dividing the collet into four fingers, but it is within the contemplation of the present invention that there could be a greater or lesser number of slots and fingers.

Turning now to FIG. 4, the extractor also includes an extractor screw 27. The screw has a head 29 with an under surface 30 on a 30-degree bevel complementary to the internal bevel 20 of the collet head. As may be seen in FIG. 3, the maximum diameter of the screw head is somewhat greater than the maximum internal diameter of the collet head.

The screw also includes a shank 32 threaded as indicated at 34. The end of the screw shank opposite the head is provided with a square or other non-circular section 36 for gripping by a wrench.

As may be seen in FIG. 5, the screw is inserted within the collet, and a nut 38 is threaded onto the screw threads 34 and bears against a washer 40 which engages the rear end of the collet which may be enlarged as shown at 42. As will be apparent, turning of the nut 38 down upon the threaded shank, while holding the screw fixed by means of the non-circular section 36, results in spreading of the collet head.

In addition to the parts heretofore enumerated, and as may be seen in FIG. 5, the extractor 10 further includes a U-shaped support or base member 44 comprising a pair of spaced legs 46 and a connecting bight 48. A bore 50 through the bight parallel to the legs 46 accommodates the screw shank 32, while another nut 52 threaded on the screw shank and engaging a bearing washer 54 is capable of exerting an axial retracting force on the screw relative to the support or base 44.

Turning now to FIG. 3, part of the structure of an internal combustion engine may be seen at 56. Included are a counterbore 58 and a planar horizontal surface 60 surrounding a circular bore 62. The valve seat insert 64 is in the form of a ring inserted within the counterbore 58 and normally fitting tight against the surface 60. As will be seen, the internal diameter of the insert 64, as indicated at 66, is greater than the internal diameter of the aperture 62. Hence it normally is not possible to insert a tool of any sort beneath the insert 64 (above it as shown in the drawing) to remove the insert. As previously noted, the insert is made of extremely hard steel so that it is not possibly for a tool to penetrate the insert to remove it. As will be seen in FIG. 3, the working corner of the insert may be beveled at 45° as indicated at 68.

In accordance with the principles of the present invention, the collet 12 is allowed to collapse or retract to its normal size, by backing off the nut 38 should it be turned down. The collet then is of such size that the serrations 26 of the head may be brought into engagement with the internal diameter of the bore 62, immediately below the surface 60. The nut 38 then is turned down with the screw held fast by the non-circular section 36, whereupon the screw is retracted within the extractor collet to spread out the head of the collet. This causes the serrations or teeth 26 to bite into the metal in which the bore 62 is formed and immediately adjacent the surface 60. Thus, the extreme end of the collet head spreads out beneath the insert 64 and underlies it, the beveled surface 24 engaging the adjacent edge of the insert 64 to move it away from the surface 60 as shown in FIG. 3.

Thereupon the nut 52 is turned down, with the screw being held against turning by the non-circular section 36. This retracts the screw 27 and also the collet 12 relative to the base or support 44 which engages adjacent parts of the engine, whereupon the insert 64 is withdrawn entirely from its position in the counterbore 58.

No significant damage is done to the metal of the engine in this withdrawal, and no marks are left except for those formed by indentation of the serrations 26. This is somewhat exaggerated in FIG. 3 for illustrative purposes, and in any event the indentation so caused is of no particular consequence when a new ring is inserted. As will be understood, standard procedure is followed in inserting the new ring, including chilling of the ring with Dry Ice to shrink it so that it fits readily within the counter-bore 58 and against the seat 60, subsequent warming of the ring allowing it to expand into a tight fit.

The specific example of the invention as herein shown and described is for illustrative purposes. Various changes in structure will no doubt occur to those skilled in the art, and will be understood as forming a part of the present invention insofar as they fall within the spirit and scope of the appended claims.

The invention is claimed as follows:

1. A valve seat extractor comprising a unitary collet, said collet having a head with a peripheral ring of V-shaped teeth adapted to engage an engine part underlying a valve seat, and means for radially expanding said collet to cause said teeth to bite into said engine part to underlie said valve seat.

2. An extractor as set forth in claim 1 wherein said extractor has a beveled surface immediately adjacent said ring of teeth and engageable with said valve seat.

3. An extractor as set forth in claim 1 wherein the means for expanding said collet comprises a screw having a beveled head, said collet having a complementary beveled surface engageable by said beveled head, nut means on said screw coacting between said screw and said collet to pull said screw axially of said collet for expansion thereof, a base through which said screw passes, and second nut means on said screw and engageable with said base to retract both said screw and said collet for extraction of a valve seat.

4. An extractor as set forth in claim 3 wherein said collet has a beveled surface immediately adjacent said peripheral ring of teeth adapted to engage a valve seat.

5. The method of extracting a valve seat which comprises inserting a unitary collet having a peripheral ring of V-shaped teeth in and partially through a valve seat, positioning said ring of teeth beyond said valve seat, expanding said collet and forcing said teeth to bite into metal beyond said valve seat and continuing outward expansion of said collet to pass said teeth at least partly beyond the internal diameter of said valve seat, and axially withdrawing said collet to exract said valve seat.

6. A valve seat extractor comprising a collet, said collet having a head with a peripheral ring of V-shaped teeth adapted to engage an engine part underlying a valve seat, and a beveled surface intermediately adjacent said ring of teeth and engageable with said valve seat, and means for radially expanding said collet to cause said teeth to bite into said engine part to underlie said valve seat, said means including a screw having a beveled head, said collet having a complementary beveled surface engageable by said beveled head, nut means on said screw coacting between said screw and said collet to pull said screw axially of said collet for expansion thereof, a base through which said screw passes, and second nut means on said screw and engageable with said base to retract both said screw and said collet for extraction of a valve seat.

References Cited

UNITED STATES PATENTS

| 2,430,847 | 11/1947 | Kirk et al. | 29—265 |
| 2,623,276 | 12/1952 | Anderson | 29—265 |
| 2,861,329 | 11/1958 | Bishman | 29—213 |
| 3,052,973 | 9/1962 | Williams | 29—265 |

FOREIGN PATENTS

| 1,830 | 5/1914 | Great Britain. |

GERALD A. DOST, Primary Examiner

U.S. Cl. X.R.

29—213, 263, 265